US012576355B2

(12) United States Patent
Mueller et al.

(10) Patent No.: US 12,576,355 B2
(45) Date of Patent: Mar. 17, 2026

(54) OUTDOOR AIR PURIFIER INCLUDING AT LEAST ONE FILTER ELEMENT

(71) Applicant: MANN+HUMMEL GmbH, Ludwigsburg (DE)

(72) Inventors: Thilo Mueller, Karlsruhe (DE); Bharatesh Alagouda, Chikkodi (IN); Chowalloor Rapheal Antomon, Bangalore (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 363 days.

(21) Appl. No.: 18/512,688

(22) Filed: Nov. 17, 2023

(65) Prior Publication Data

US 2024/0082768 A1 Mar. 14, 2024

Related U.S. Application Data

(63) Continuation of application No. PCT/EP2022/066747, filed on Jun. 20, 2022.

(30) Foreign Application Priority Data

Jun. 25, 2021 (EP) ..................................... 21181814

(51) Int. Cl.
B01D 46/00 (2022.01)
B01D 46/24 (2006.01)
(Continued)

(52) U.S. Cl.
CPC ..... B01D 46/0005 (2013.01); B01D 46/0047 (2013.01); B01D 46/2403 (2013.01); (Continued)

(58) Field of Classification Search
CPC .. B01D 46/58; B01D 46/60; B01D 2275/203; B01D 2275/206; B01D 2279/40; (Continued)

(56) References Cited

U.S. PATENT DOCUMENTS 5,342,238 A 8/1994 Segerpalm
5,753,000 A 5/1998 Chiu et al.
(Continued)

FOREIGN PATENT DOCUMENTS

CN 206633762 U 11/2017
CN 207565285 U 7/2018
(Continued)

OTHER PUBLICATIONS

Machine translation of KR 10-2075373 (Year: 2020).*
(Continued)

*Primary Examiner* — Robert Clemente

(57) ABSTRACT

An outdoor air purifier includes a housing including at least one housing cover part, a mounting base, at least one flow inlet for outdoor air to be purified, at least one flow outlet for cleaned air, and an inner clean air space, a fan having a standing rotational axis and arranged within the housing, wherein the at least one flow inlet is arranged radially with regards to the standing rotational axis, and the at least one
(Continued)

flow outlet is arranged axially with regards to the standing rotational axis, and at least one filter element at least partially surrounding the inner clean air space. The fan is displaced axially from the mounting base and is in fluid connection with the inner clean air space. The at least one filter element extends essentially parallel to the standing rotational axis.

15 Claims, 10 Drawing Sheets

(51) Int. Cl.
    *B01D 46/42*       (2006.01)
    *B01D 46/60*       (2022.01)
(52) U.S. Cl.
    CPC ......... *B01D 46/4245* (2013.01); *B01D 46/60* (2022.01); *B01D 2273/30* (2013.01); *B01D 2275/206* (2013.01); *B01D 2279/40* (2013.01)
(58) Field of Classification Search
    CPC ............ B01D 2273/30; B01D 46/4245; B01D 46/2403; B01D 46/2411; B01D 46/0005; B01D 46/0047; F24F 8/108; F24F 7/003
    See application file for complete search history.

(56) References Cited

U.S. PATENT DOCUMENTS

| | | | |
|---|---|---|---|
| 5,914,414 A | 6/1999 | Taomo et al. | |
| 9,266,050 B2 | 2/2016 | Schulz et al. | |
| 11,273,280 B2 | 3/2022 | Hammes et al. | |
| 2022/0008601 A1* | 1/2022 | Wang | B01D 46/2411 |
| 2023/0233971 A1* | 7/2023 | Choi | B01D 46/0005 |
| | | | 55/483 |

FOREIGN PATENT DOCUMENTS

| | | | |
|---|---|---|---|
| DE | 102018130158 A1 | 5/2020 | |
| JP | H07112108 A | 5/1995 | |
| JP | H11157379 A | 6/1999 | |
| JP | 5679796 A | 7/2012 | |
| JP | 2012126351 A | 7/2012 | |
| KR | 100225503 A | 10/1999 | |
| KR | 100807813 B1 | 2/2008 | |
| KR | 20170140578 A | 12/2017 | |
| KR | 102075373 B1 | 2/2020 | |
| WO | 2007040074 A1 | 4/2007 | |

OTHER PUBLICATIONS

International Search Report in corresponding International Appln. No. PCT/EP2022/066747, Sep. 9, 2022, Rijswijk, Netherlands.

* cited by examiner

OUTDOOR AIR PURIFIER INCLUDING AT LEAST ONE FILTER ELEMENT

CROSS-REFERENCE TO RELATED APPLICATIONS

This application is a continuation application of International Application No. PCT/EP2022/066747 filed on Jun. 20, 2022, which claims the benefit of European Application No. 21181814.1 filed on Jun. 25, 2021, the entire disclosures of which are incorporated herein by reference for all purposes.

BACKGROUND

The invention relates to an outdoor air purifier including at least one filter element and a use of a filter element.

Particle filter systems such as fine dust filter systems known in the art use direct flow alignments with axial fans in vertical position and filter elements positioned in upstream position from said fan. The height of these systems is typically determined by the diameter of the fan.

JP5679796 B2 discloses an air conditioner for a vehicle for removing particles from air. Purified air is exhausted from the air conditioner into the vehicle while particles are maintained in the air conditioner.

SUMMARY

It is an object of the invention to provide an outdoor air purifier which allows for a reduced pressure drop.

Another object of the invention is to provide a use of a filter element in an air purifier.

The first object is achieved by an outdoor air purifier, including a housing including at least one housing part, wherein the housing has at least one flow inlet for outdoor air to be purified and at least one flow outlet for cleaned air, a fan with a standing rotational axis arranged within the housing, wherein the at least one flow inlet is arranged radially with regards to the rotational axis of the fan, wherein the at least one outlet is arranged axially with regards to the rotational axis of the fan, at least one filter element that at least partially surrounds, in particular circumferentially, an inner clean air space of the housing, wherein the fan is displaced axially from a mounting base of the housing and is in fluid connection with the inner clean air space, wherein the at least one filter element extends essentially parallel to the rotational axis of the fan.

Another object is achieved by use of a filter element in a vehicle mountable outdoor air purifier, the filter element being configured for connecting to at least one filter element through at least one side band extending essentially parallel to a mounting base, wherein the side band has at least one through-hole, in particular a cut or a slot, in a connecting region between two neighboring filter elements, wherein the side band is configured for a housing structure, preferably a strut or a blade, protruding through the through-hole in the side band, in particular wherein the side band is configured for a housing structure, preferably a strut or a blade, protruding through the through-hole in the side band.

Favorable embodiments and advantages of the invention are apparent from the further claims, the description and the drawings.

In a first aspect of the invention an outdoor air purifier is proposed, including a housing, the housing including at least one housing part, wherein the housing has at least one flow inlet for outdoor air to be purified and at least one flow outlet for cleaned air, a fan with a standing rotational axis arranged within the housing, wherein the at least one flow inlet is arranged radially with regards to the rotational axis of the fan, wherein the at least one outlet is arranged axially with regards to the rotational axis of the fan, at least one filter element that at least partially surrounds, in particular circumferentially, an inner clean air space of the housing, wherein the fan is displaced axially from a mounting base of the housing and is in fluid connection with the inner clean air space, wherein the at least one filter element extends essentially parallel to the rotational axis of the fan.

The air purifier has a low height and a low power consumption as well as a low pressure drop between flow inlet and flow outlet. Fans facing upwards or downwards imply the redirection of the air by up to 90°. This allows for using much larger diameter fans than in vehicle mountable outdoor air purifiers following a purely axial (with regards to a length axis of the vehicle) flow concept. This allows for simple servicing options when filter elements have to be exchanged. In addition, high versatility in terms of element shapes, filter classes and two stage options such as main filter element and prefilter element are possible.

The low power consumption allows to aggregate higher flow rates, e.g., on bus roofs, and lowers the bar for application on smaller vehicles with smaller batteries and weaker alternators, such as forklifts, tricycles, production machinery, airport carriers and the like.

For small vehicles, the air flow direction may also be advantageous, as the driver will not be exposed to a strong draft which may be created by the air purifier.

A fan may be used that is larger than the system height. Advantageously the fan may be tilted, preferably by 90°, from the vertical, facing upwards or downwards. Due to the limited system height, it is further advantageous to arrange the filter elements around the fan to increase the flow cross-section, i.e. the filter cross-section, which correlates with lower achievable filter element and filter system pressure loss. Pressure loss in the air purifier is mainly governed by the pressure loss of the filter element. Considering a given fan and target flow rate, a lower pressure drop allows to reduce the fan rotational speed, which leads to reduced power consumption and a reduction of the noise emissions. A concentric arrangement is furthermore advantageous because it leads to a circular clean air space that allows for a homogeneous air flow towards the fan. The free space can further be used to implement an (optional) flow grid or other air guiding structures optimizing the flow pattern towards the fan and leading to an improvement of pressure drop and acoustics.

Advantageously, it is possible to stay within the height range of other typical vehicle roof aggregates (e.g. A/C systems), which rarely exceed 300 mm.

According to a favorable embodiment of the outdoor air purifier the at least one filter element in total may cover an angular portion of at least 270°, preferably at least 330°, of the circumference of the inner clean air space. This allows for a large filter area inside the housing.

According to a favorable embodiment of the outdoor air purifier the filter element may be arranged essentially coaxial to the rotational axis of the fan. A concentric arrangement advantageously leads to a circular clean air space that allows for a homogeneous air flow towards the fan.

The outdoor air purifier includes a multitude of filter element segments of the at least one filter element, neighboring each other circumferentially, wherein the multitude of filter segments are arranged in a polygonal or circular shape around the rotational axis of the fan.

As main filter element round elements or alternatively n-edged arrangements of filter segments, in particular concentric arrangements, may be used, such as hexagonal, octagonal arrangements or the like. In a preferred embodiment, the main filter element may also be concentric with the fan. The air purifier may feature two flow inlets from opposite directions of the housing, and prefilter elements arranged between these inlets and the main elements for pre-separating coarse dust, water, biological material as well as for preventing stone chipping. Such a two-inlet arrangement is advantageous in terms of modularity, as a multitude of filter systems can be stacked side by side, e.g. on a bus roof. Other arrangements with different inlet orientations are also feasible, and allow for different modular approaches. For instance one inlet on two neighboring edges could be used in a square array of the air purifier.

At least two of the multitude of filter segments are connected by at least one side band extending essentially parallel to the mounting base, wherein the side band has at least one through-hole, in particular a cut or a slot, in a connecting region between two neighboring filter segments.

The side band may connect a prefilter element and a main filter element in radial direction. Additionally or alternatively, the at least one filter element may be divided into filter segments which are connected by the side band.

Advantageously, the struts protruding in the through-hole of the side band may assure the correct mounting of the filter elements, in particular of n-edged main filter segments for main filter elements as well as prefilter elements and assure the correct flow direction in a simple poka-yoke fashion.

A housing structure is provided for positioning the multitude of filter element segments. In particular the housing structure may be configured as a strut or blade. The housing structure is configured to protrude through the side band.

The housing structure may be arranged at the mounting base or the housing cover part and especially extending parallel to the rotational axis of the fan.

By providing the housing structure such as struts or blades protruding through the through hole of the side band the correct mounting of the filter elements and/or the filter segments and the correct flow direction are achieved.

Slicing the filter elements into filter segments allows the filter elements to be packaged and transported as flat prisms, thus minimizing package volume and allowing stacking the filter elements in a compact manner.

According to a favorable embodiment of the outdoor air purifier the at least one filter element may be arranged concentrically around a center of the inner clean air space, wherein the center of the inner clean air space is defined by the rotational axis of the fan. This allows for a compact arrangement of filter elements and fan.

According to a favorable embodiment of the outdoor air purifier the filter element may include at least one filter medium, in particular provided in the form of a pleated filter bellows.

According to a favorable embodiment of the outdoor air purifier the fan may be held by a support structure attached to the mounting base. Optionally the support structure may include at least the one strut, preferably extending perpendicular with regards to a plane of the mounting base.

In one preferred embodiment, the support structure is arranged below the fan. The mounting structure is mounted to the baseplate and positioned in the clean air room formed by the at least one main filter element. Advantageously, the housing cover itself may fulfil the functions of creating air tightness between main element forming an air tight clean air room and tightening the support structure of the fan. In this case, the concentric arrangement offers the benefit that only a small region within the air purifier needs to be kept sealed or airtight, i.e. the interface between the filter element and housing cover and the adjacent area, e.g., an inner ring area, between filter element and fan. On the bottom of the at least one filter elements, an interface between element and mounting base is created which can by tightened in a simple fashion. For instance axial sealing with polyurethane (PU) or foam, or even mere labyrinth sealing can be employed which is sufficient for filter efficiencies when sidebands are used. The prefilter does not necessarily require airtight sealing, so that simple labyrinth sealing approaches are sufficient.

According to a favorable embodiment of the outdoor air purifier the support structure may be embodied as a support cage having a multitude of struts angularly distributed around the circumference. This yields a stable and robust support for the fan.

According to a favorable embodiment of the outdoor air purifier the support structure may act as a radial support for the at least one filter element. Advantageously, a compact and stable support is provided along the filter element surface.

According to a favorable embodiment of the outdoor air purifier the at least one filter element is curved with a curving radius corresponding to a radius of the support structure. This improves the support of the filter element.

According to a favorable embodiment of the outdoor air purifier the housing cover part may include a top cover wall extending axially displaced from the mounting base, preferably at least parallel, and preferably the housing cover part may include at least one side wall connecting the housing cover part to the mounting base.

Advantageously, a vacuum formed hood may be used to form the housing cover part of the housing. The bottom of the air purifier may be formed by a base plate with multiple holes intended for, e.g., water drainage as well as mounting the air purifier to a position, e.g., by bolting, screwing and the like.

Further advantageous functions can be integrated into the housing cover part, such as grooves to guide rain water and/or increase the stiffness (mechanics/acoustics), formation of air guiding structures, e.g. diffusor at the inlet and outlet regions.

Servicing the filter element can be done in two different fashions, leading to different system design. In one embodiment, the housing cover part may be removed completely. In another embodiment the housing cover part may be tilted by using a hinge. This service concept allows a multitude of prefilter and main element shapes and styles, such as round, flat panels, conical, or V-banks with variable bank size and the like, as long as they form an essentially circular clean air space and hence a homogeneous air distribution towards the fan.

In another embodiment an alternative service option may include filter elements that can be serviced through the inlet openings. This is advantageous for passenger car applications, as the roof of passenger cars is difficult to access. This servicing concept requires the main element to be splitable and implies the need to design an interface between the split element halves, such as foam sealing, flat sealing and the like and detachable connectors.

According to a favorable embodiment of the outdoor air purifier the electric power consumption per flow rate may be less than 100 W per 1000 m³/h. Such parameters are achievable by the construction of the proposed air purifier.

According to a favorable embodiment of the outdoor air purifier the height of the outdoor air purifier may be less than 400 mm, preferably less than 350 mm, most preferably less than 300 mm. Such parameters are achievable by the construction of the proposed air purifier.

According to a favorable embodiment of the outdoor air purifier the ratio of height vs. fan diameter may be less than 1, preferably less than 0.8, most preferably less than 0.7. Such parameters are achievable by the construction of the proposed air purifier.

According to a favorable embodiment of the outdoor air purifier the filter efficiency may be between 50% and 95%, preferably between 60%-90% (gravimetric filter efficiency for fine dust, expressed as ePM2.5 as per ISO 16890:2016). Such parameters are achievable by the construction of the proposed air purifier.

Advantageously, the power consumption is so low that the proposed air purifier becomes an option to power the system independently and without connection to an on-board 12V/24V circuits of vehicles by, e.g., batteries, solar panels, contact free magnetic charging and the like, which simplifies homologation and customer acceptance. In particular there is no loss of the range for electric vehicles.

In an advantageous embodiment the outdoor air purifier has least one contact free electrical energy transfer means, in particular an inductive electrical energy transfer means, arranged at the housing.

According to a favorable embodiment of the outdoor air purifier the top cover wall may include at least one opening that acts as the flow outlet, wherein preferably a diameter of the opening corresponds to a diameter of the fan.

In another as well preferred embodiment the top cover wall in the region of the opening has a circumferential wall surrounding the opening that provides in the axial direction an increasing diameter of the opening. The diameter of the opening in particular increases in the direction of an outlet flow. This has the advantage that the circumferential wall forms a diffusor (in other words a "bellmouth shape") on the outlet side of the fan that optimizes the flow.

According to another aspect of the invention a use of a filter element in a vehicle mountable outdoor air purifier is proposed, the filter element including a multitude of filter element neighboring each other circumferentially. The multitude of filter segments is adapted to be arranged in a polygonal or circular shape around the rotational axis of the fan of the outdoor air purifier in an installed state. At least two of the multitude of filter element segments are connected through at least one side band adapted to extend essentially parallel to the mounting base of the outdoor air purifier in an installed state. Further, the side band has at least one through-hole, in particular a cut or a slot, in a connecting region between two neighboring filter segments.

By providing the housing structure such as struts or blades protruding through the through hole of the side band the correct mounting of the filter elements and/or the filter segments and the correct flow direction are achieved.

Slicing the filter elements into filter segments allows the filter elements to be packaged and transported as flat prisms, thus minimizing package volume and allowing stacking the filter elements in a compact manner.

The side band is configured for a housing structure of the outdoor air purifier, preferably a strut or a blade, protruding through the through-hole in the side band.

Advantageously, the outdoor air purifier allows for substantial reductions of the fine dust emission footprint of a vehicle by means of the filter element. Very high flow rates are required, in the order of 10.000 m³/h for a bus and full compensation of fine dust emissions (depending on the environmental pollution concentration level). With the limited power available on the vehicle, power efficiency is extremely important for systems targeting full compensation. This implies the need for filter systems with extremely low pressure drop and for the use of large fans. Both can be improved by increasing the filter system's dimensions. However, filter system size and especially system height are limited for roof-carried systems.

High flow rate per power ratios are particularly relevant for fine dust filters on battery electric vehicles, as the power consumption of the air purifier may directly affect the range.

BRIEF DESCRIPTION OF DRAWINGS

The present invention together with the above-mentioned and other objects and advantages may best be understood from the following detailed description of the embodiments, but not restricted to the embodiments, wherein is shown in.

DETAILED DESCRIPTION

Figure 1:
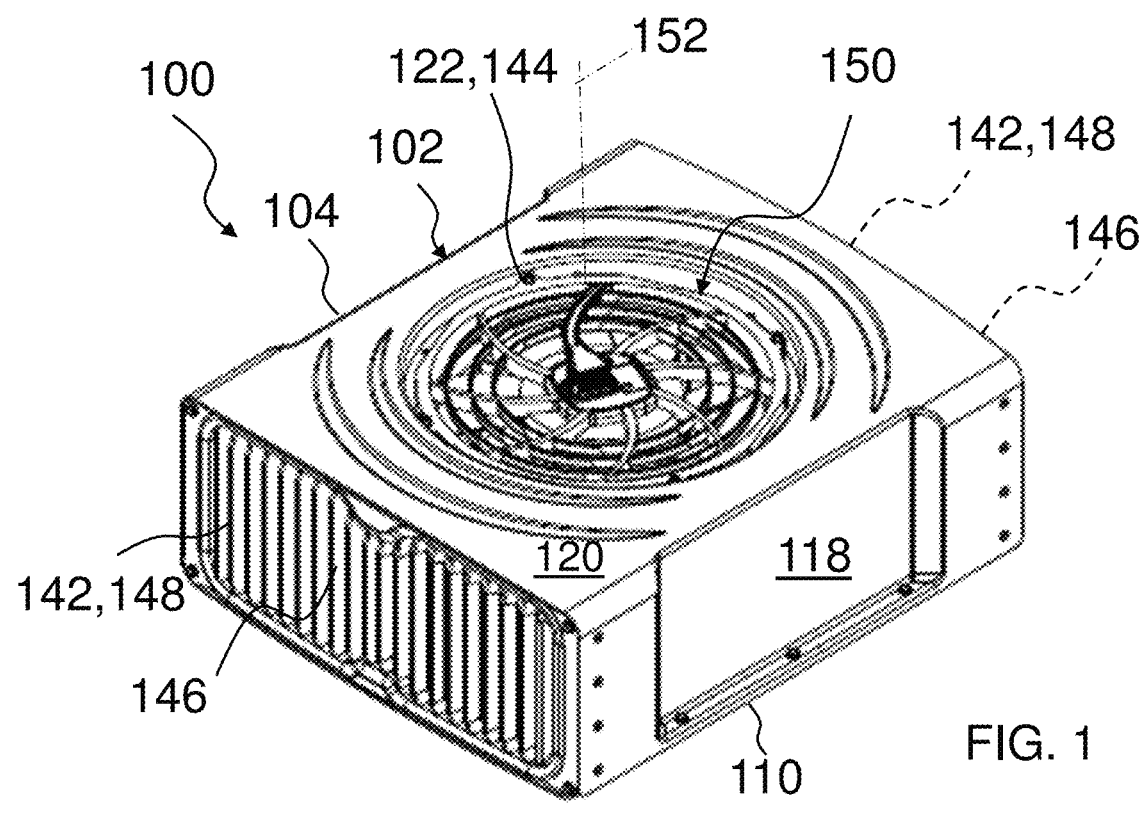
FIG. 1 is a perspective view of an outdoor air purifier according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
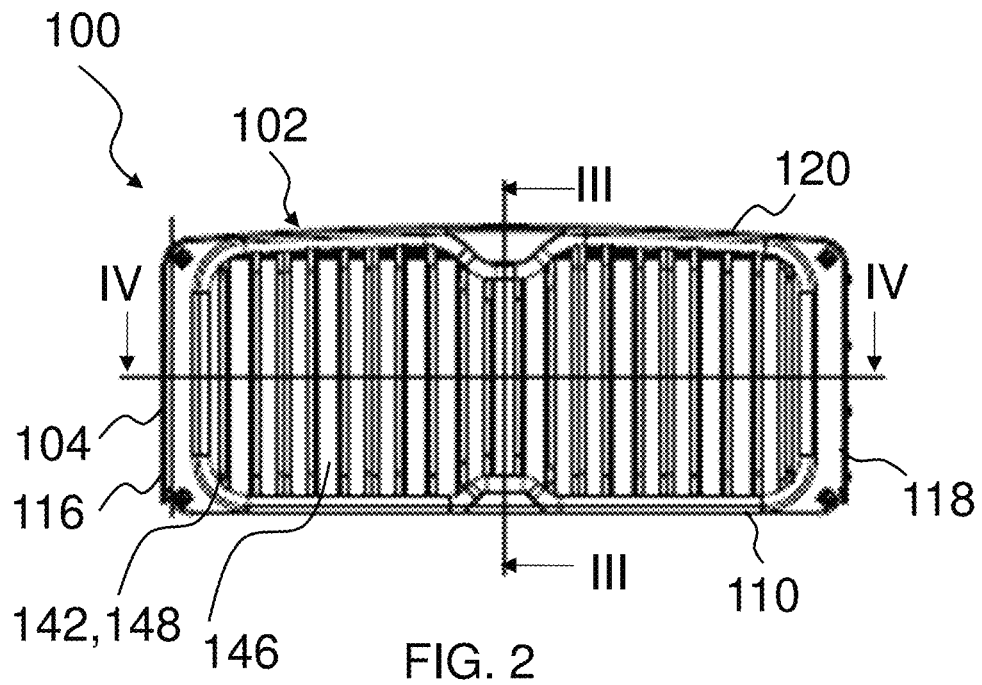
FIG. 2 is a front view of the air purifier shown in FIG. 1 indicating intersection lines III-III and IV-IV.
Figure 3:
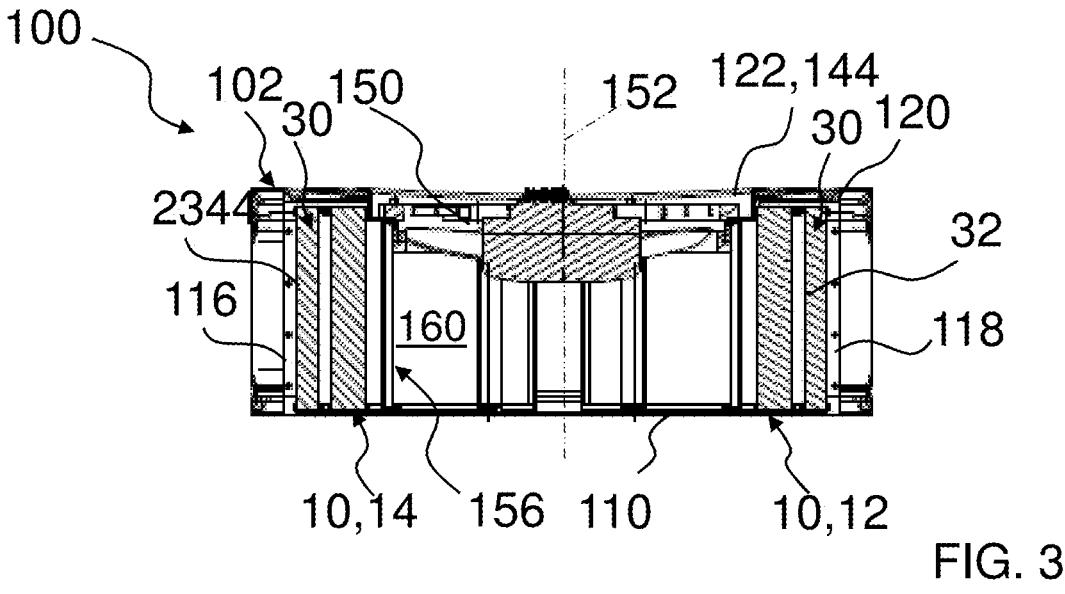
FIG. 3 is a cut view through the outdoor air purifier of FIG. 1 along intersection line III-III of FIG. 2.
Figure 4:
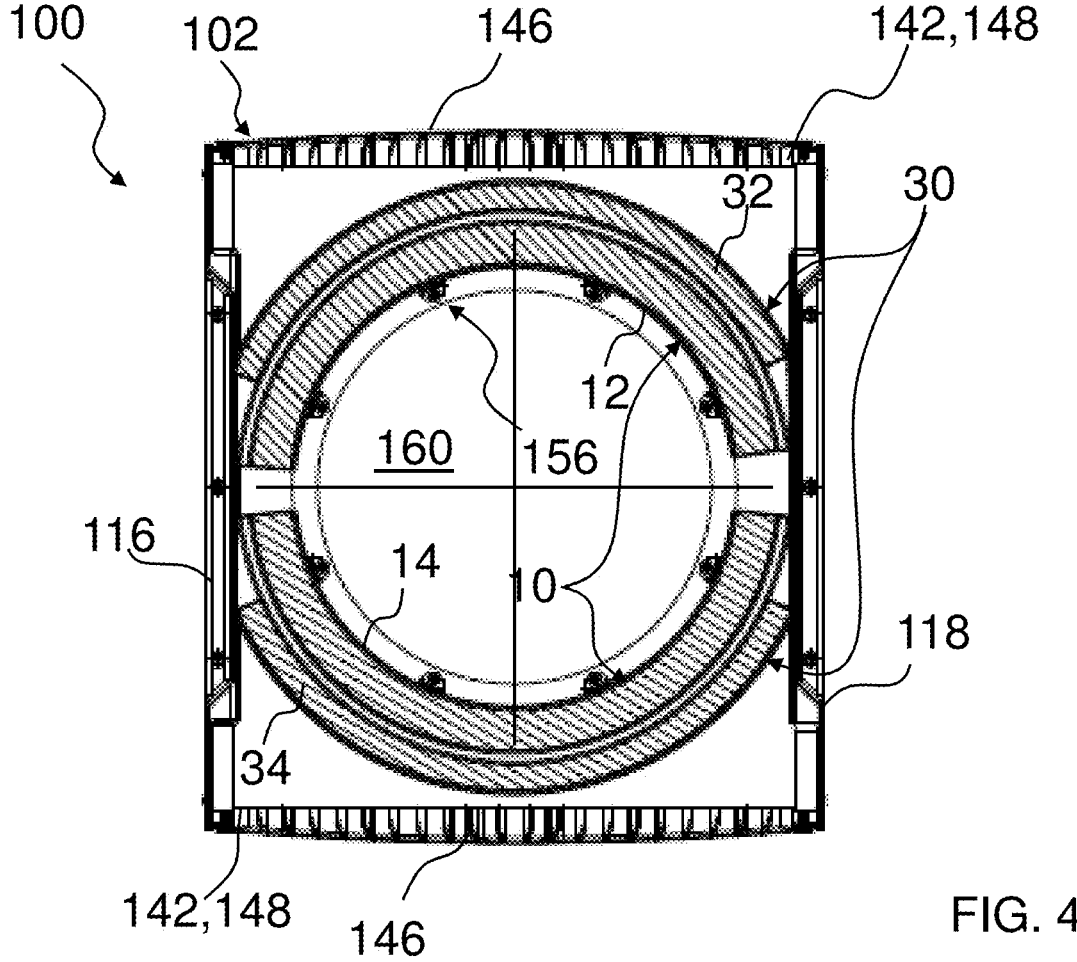
FIG. 4 is a cut view through the outdoor air purifier of FIG. 1 along intersection line IV-IV of FIG. 2.
Figure 5:
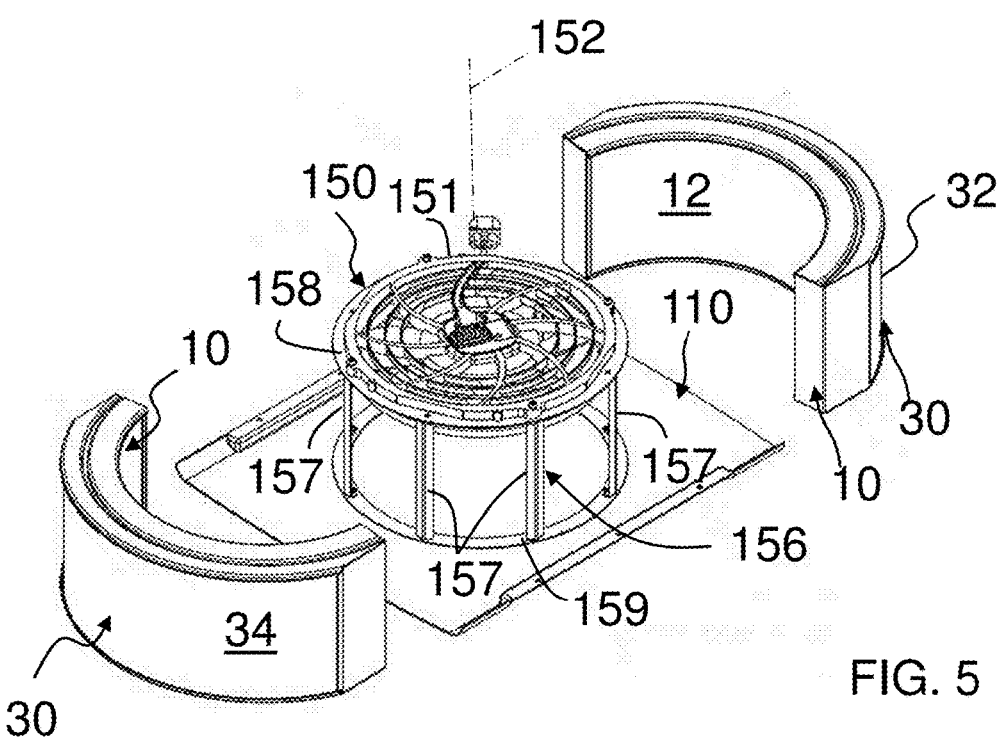
FIG. 5 is an exploded view of the arrangement of the filter element and the fan of the outdoor air purifier of FIG. 1.
Figure 6:
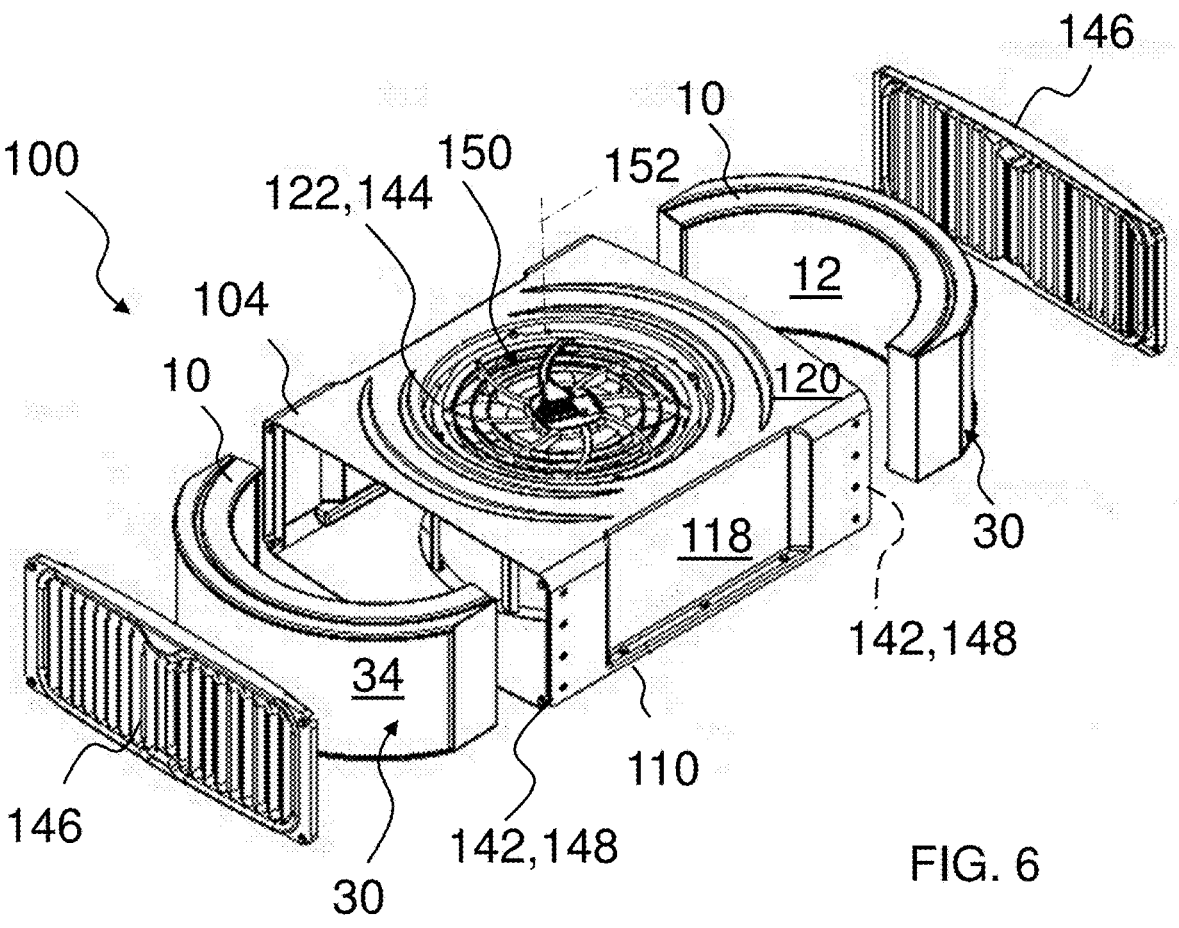
FIG. 6 is an exploded view of the outdoor air purifier of FIG. 1.

FIGS. 1 to 6 illustrate a first embodiment of an outdoor air purifier 100 according to the invention. FIG. 1 shows a perspective view of an outdoor air purifier 100 and FIG. 2 shows a front view of the air purifier 100 indicating intersection lines III-III and IV-IV. FIG. 3 shows a cut view through the outdoor air purifier 100 along intersection line III-III of FIG. 2 and FIG. 4 shows a cut view through the outdoor air purifier 100 along intersection line IV-IV of FIG. 2. FIG. 5 shows in an exploded view the arrangement of filter elements 10, 30 and a fan 150 of the outdoor air purifier 100 and FIG. 6 shows in an exploded view the outdoor air purifier 100.

The outdoor air purifier 100 includes a housing 102 mounted to a mounting base 110. The mounting base 110 includes at least one mounting element that is adapted for the mounting of the outdoor air purifier 100 to a vehicle in particular a roof or roof rail or the like.

The housing 102 includes at least one housing cover part 104 and has a flow inlet 142 for outdoor air to be purified on each of two opposing sides of the housing 102 and a flow outlet 144 for cleaned air in a housing cover part 104. The flow inlet 142 is arranged between two side walls 116, 118 of a housing cover part 104. The housing cover part 104 includes the side walls 116, 118 which connect the housing cover part 104 to the mounting base 110. The housing cover part 104 includes or consists of a plastic material, especially an injection-moldable plastic material. The housing cover part 104 may be preferably produced by vacuum forming.

The housing cover part 104 includes a top cover wall 120 extending axially displaced from the mounting base 110 and is arranged, in this embodiment, perpendicular, to a rotational axis 152 of a fan 150. The top cover wall 120 includes an opening 122 that acts as the flow outlet 144. In this embodiment a diameter of the opening 122 corresponds to a diameter of the fan 150.

The housing 102 has a planar grille 146 extending over each flow inlet 142. The flow inlet 142 is provided in an opening 148 of the housing 102. The grille 146 may extend over the complete opening 148.

The fan 150 with its standing rotational axis 152 is arranged within the housing 102, wherein the at least one flow inlet 142 is arranged radially with regards to the rotational axis 152 of the fan 150. The at least one outlet 144 is arranged axially with regards to the rotational axis 152 of the fan 150.

The fan 150 is displaced axially from the mounting base 110 of the housing 102 and is in fluid connection with the inner clean air space 160. The fan 150 is held by a support structure 156 attached to the mounting base 110. The support structure 156 includes at least the one strut 157 which extends perpendicular with regards to a plane of the mounting base 110.

The support structure 156 is embodied as a support cage having a multitude of struts 157 angularly distributed around the circumference. The support structure 156 is arranged within an inner clean air space 160 and delimits the inner clean air space 160 radially. The fan 150 is attached to an upper ring element 158 of the support structure 156 which is supported by the struts 157. For instance, a grid-like cover 151 of the fan 150 may rest on the upper ring element 158 (FIG. 5). The struts 157 are resting on a lower ring segment 159 of the support structure 156 which is attached to the mounting base 110. In particular, the support structure 156 may be composed of cylinder segments with two strut segments at each side connected at one end with regards to the rotational axis 152 of the fan 150 by an upper circular segment and at the opposing end with regards to the fan rotational axis 152 by a lower circular segment. In an assembled state of the cylinder segments, two abutting strut segment constitute one of the struts 157.

The support structure 156 acts as a radial support for the at least one filter element 10, 30. The filter elements 10, 30 are curved with a curving radius corresponding to a radius of the support structure 156.

The filter element 10 as main filter element surrounds the inner clean air space 160 of the housing 102 circumferentially and extends essentially parallel to the rotational axis 152 of the fan 150. A prefilter element 30 is arranged radially outside, i.e. upstream, of the filter element 10. The pre-30 and main filter elements 10 are connected by a curved frame in that they are separably inserted. The prefilter element 30 and the main filter element 10 can be separately removed from the frame, as this advantageously allows for different service intervals (in general the prefilter element is loaded timely before the main filter element). In other embodiments it is also possible that the prefilter element 30 and the main filter element 10 are inseparably connected to the frame. An axial end face of the frame can have a seal extending in the circumferential direction.

The filter elements 10, 30 in total cover an angular portion of at least 270°, preferably at least 330°, of the circumference of the inner clean air space 160 and are arranged essentially coaxial to the rotational axis 152 of the fan 150.

The filter elements 10, 30 are each split in two element parts 12, 14 and 32, 34, respectively. The element parts 12, 14 and 32, 34 may be configured as semicircular segments facing each other. Between respective circumferential ends of the frames a sealing can be provided, wherein the sealing is preferably arranged as a sealing lip or the like on a circumferential end face of at least one of the frames.

The upper and lower sides of the filter element parts 12, 24, 32, 34 abut the housing cover part 104 and the mounting base 110, respectively (FIG. 3) and the side edges of the filter element parts 12, 14, 32, 34 abut side walls 116, 118 of the housing 102 in a tight manner and seal the inner clean air space 160 (FIG. 4).

A typical value of the electric power per flow rate for the air purifier 100 is not more than 100 W per 1000 $m^3$/h. The height of the housing 102 is less than 400 mm, preferred less than 350 mm, most preferred less than 300 mm. A ratio of height vs. fan diameter is less than 1, preferred less than 0.8, most preferred less than 0.7. The filter efficiency is between 50-95% ePM2.5 (ISO 16890), preferably between 60-90%. However other filtration efficiencies can be achieved by simply exchanging the filter elements.

As can be seen in particular in FIGS. 5 and 6, the filter elements 10, 30 can be removed from the housing 102 by removing the grilles 146 from openings 148 and removing the element parts 12, 32 and 14, 34 through the openings 148.

Alternatively, however, it may be possible to remove the housing cover part 104 and remove the filter elements 10, 30 in vertical direction. In this case, the grilles 146 are preferably attached to the mounting base 110. In this case, the grilles are attached to the mounting base 110, e.g., by means of screws, clamps, hooks, weld seam, glue or the like.

In an alternative embodiment not shown, the housing cover part 104 may be attached to the mounting base 110 via a hinge so that the housing 102 can be opened by tilting the housing cover part 104.

Figure 7:
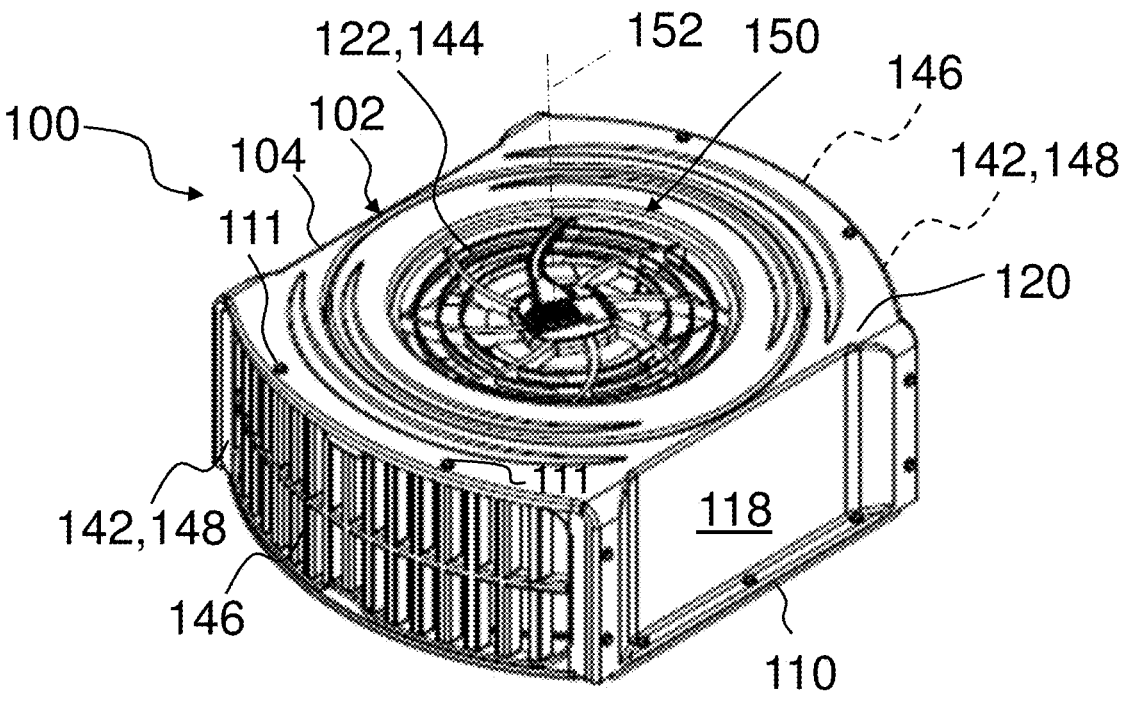
FIG. 7 is a perspective view of an outdoor air purifier according to another embodiment of the invention.
Figure 8:
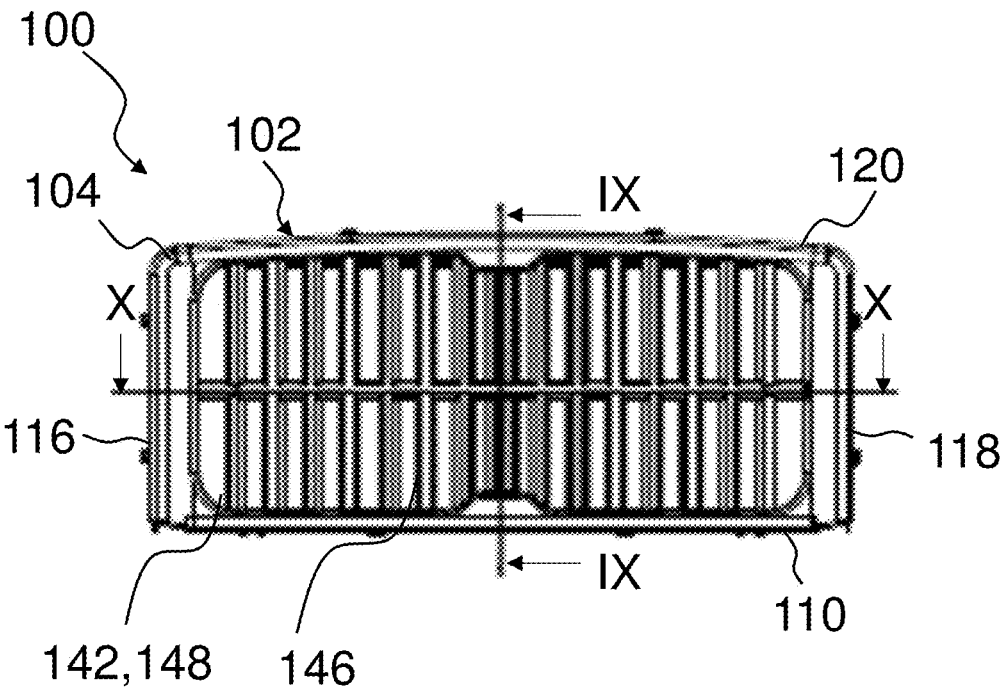
FIG. 8 is a front view of the air purifier shown in FIG. 7 indicating intersection lines IX-IX and X-X.
Figure 9:
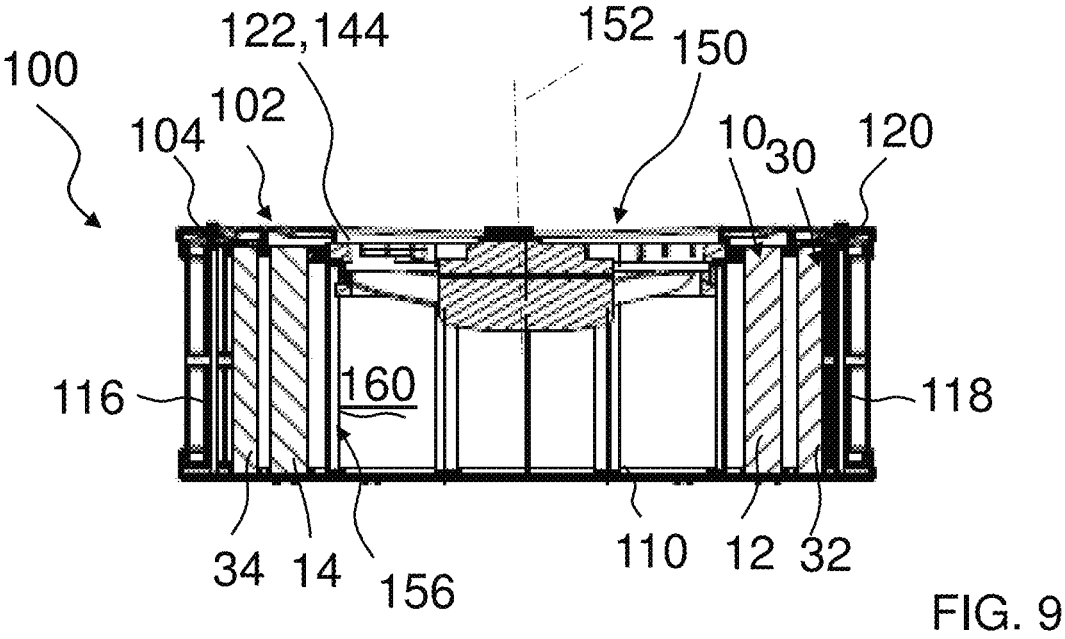
FIG. 9 is a cut view through the outdoor air purifier of FIG. 7 along intersection line IX-IX of FIG. 8.
Figure 10:
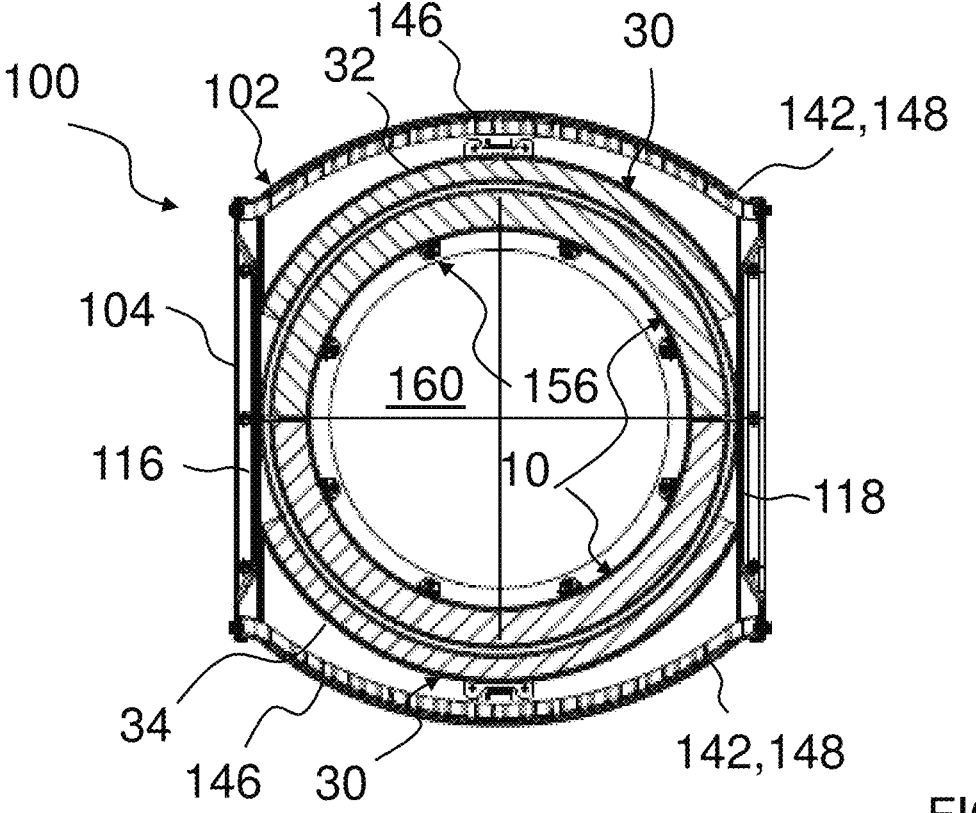
FIG. 10 is a cut view through the outdoor air purifier of FIG. 7 along intersection line X-X of FIG. 8.
Figure 11:
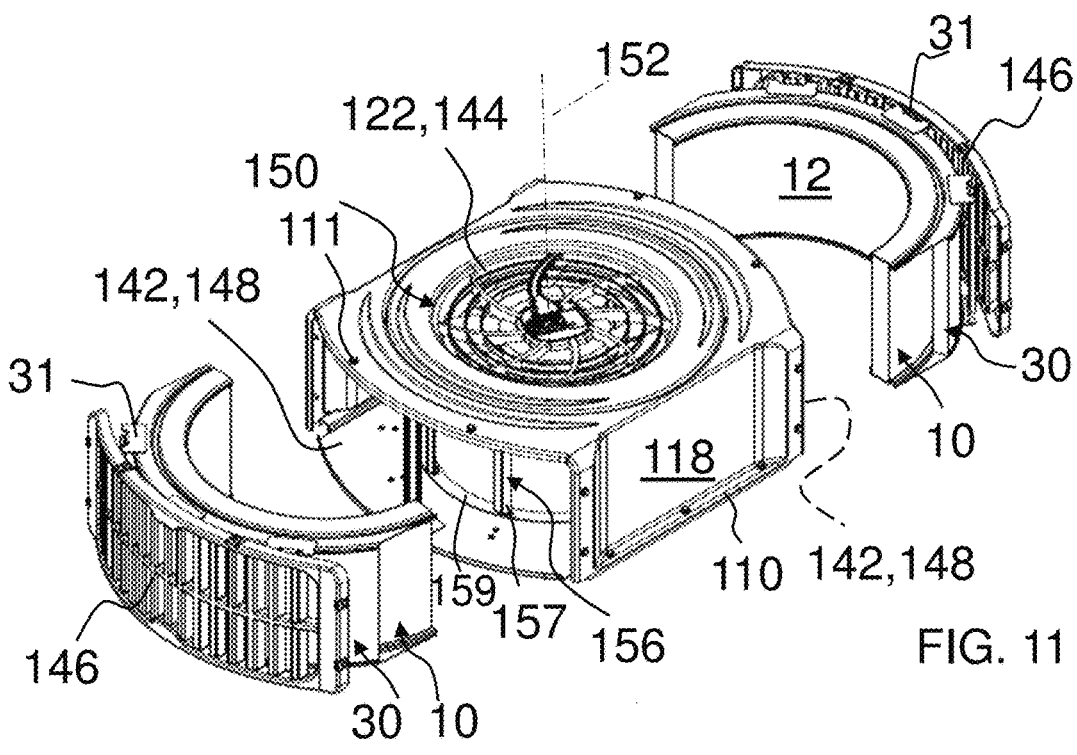
FIG. 11 is an exploded view of the arrangement of the filter element and the fan of the outdoor air purifier of FIG. 7.
Figure 12:
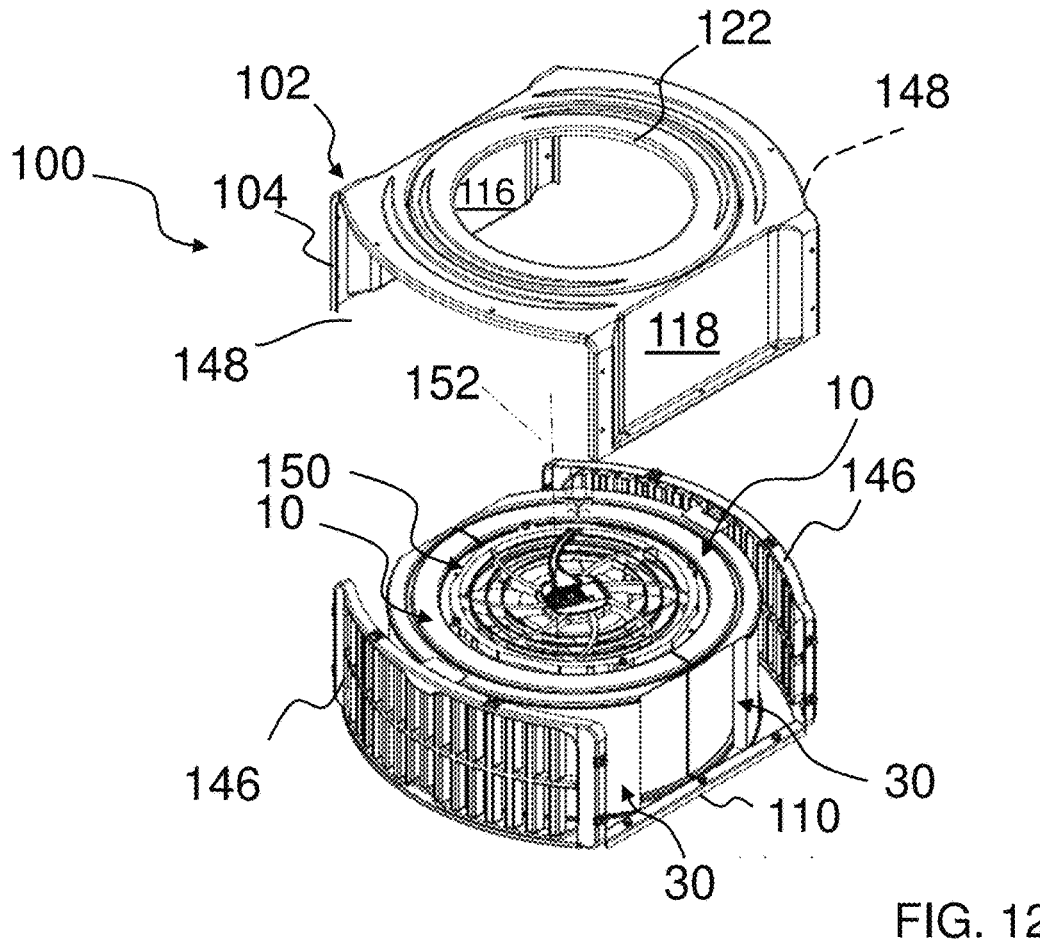
FIG. 12 is a partially exploded view of the outdoor air purifier of FIG. 7.

FIGS. 7 to 12 show another embodiment of an outdoor air purifier 100 according to the invention. FIG. 7 shows a perspective view of an outdoor air purifier 100 and FIG. 8 shows a front view of the air purifier 100 indicating intersection lines IX-IX and X-X. FIG. 9 shows a cut view through the outdoor air purifier 100 along intersection line IX-IX of FIG. 8 and FIG. 10 shows a cut view through the outdoor air purifier 100 along intersection line X-X of FIG. 8. FIG. 11 shows in an exploded view the arrangement of filter elements and a fan 150 of the outdoor air purifier 100, and FIG. 12 shows in a partially exploded view the outdoor air purifier 100.

The configuration of the air purifier 100 is essentially the same as in the embodiment described in FIGS. 1 to 6 especially in regards of the housing, the fan 150, the support structure 156. To avoid unnecessary repetitions, reference is made to the description of the aforementioned embodiments for components which are not described in context with the FIGS. 7 to 12.

Other than in the previous embodiments, the grilles 146 covering the two opposing openings 148 of the two flow inlets 142 are curved, e.g. as cylinder segments. The housing cover part 104 exhibit corresponding similarly curved openings 148.

As can be seen in FIG. 11, the grilles 146 may be attached to the housing 102 by screws or the like attached through holes 111 in the top cover wall 120 of the housing cover part 104.

The prefilter element 30 provides spacers 31 for positioning the grilles 146 in the opening 148. In this case, each half of the split filter elements 10, 30 can be inserted or removed from the housing 102 through the opposing openings 148. In this case, the housing cover part 104 is attached to the mounting base 110 by means of screws, clamps, hooks, weld seam, glue or the like.

Alternatively, as shown in FIG. 12, the housing cover part 104 may be attached removably to the mounting base 110 so that the filter elements 10 and/or 30 may be removed in a vertical direction from the housing 102. In this case, the grilles are attached to the mounting base 110, e.g., by means of screws, clamps, hooks, weld seam, glue or the like.

In an embodiment not shown, the housing cover part 104 may be attached to the mounting base 110 via a hinge so that the housing 102 can be opened by tilting the housing cover part 104.

Figure 13:
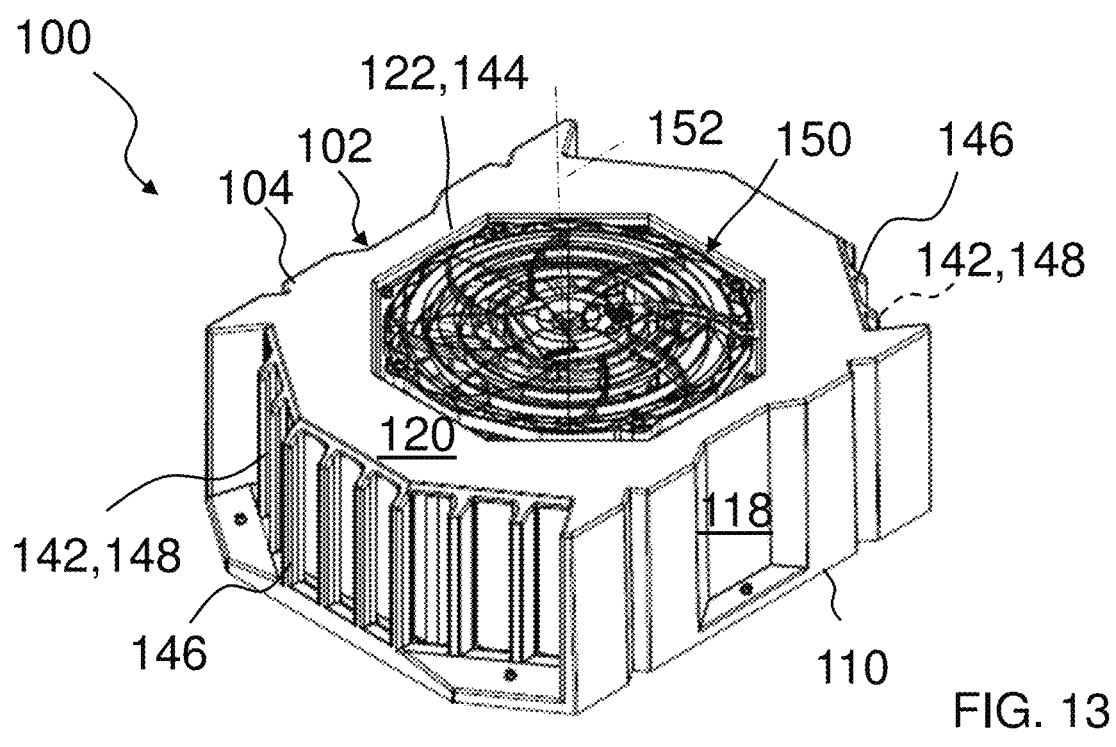
FIG. 13 is a perspective view of an outdoor air purifier according to another embodiment of the invention.
Figure 14:
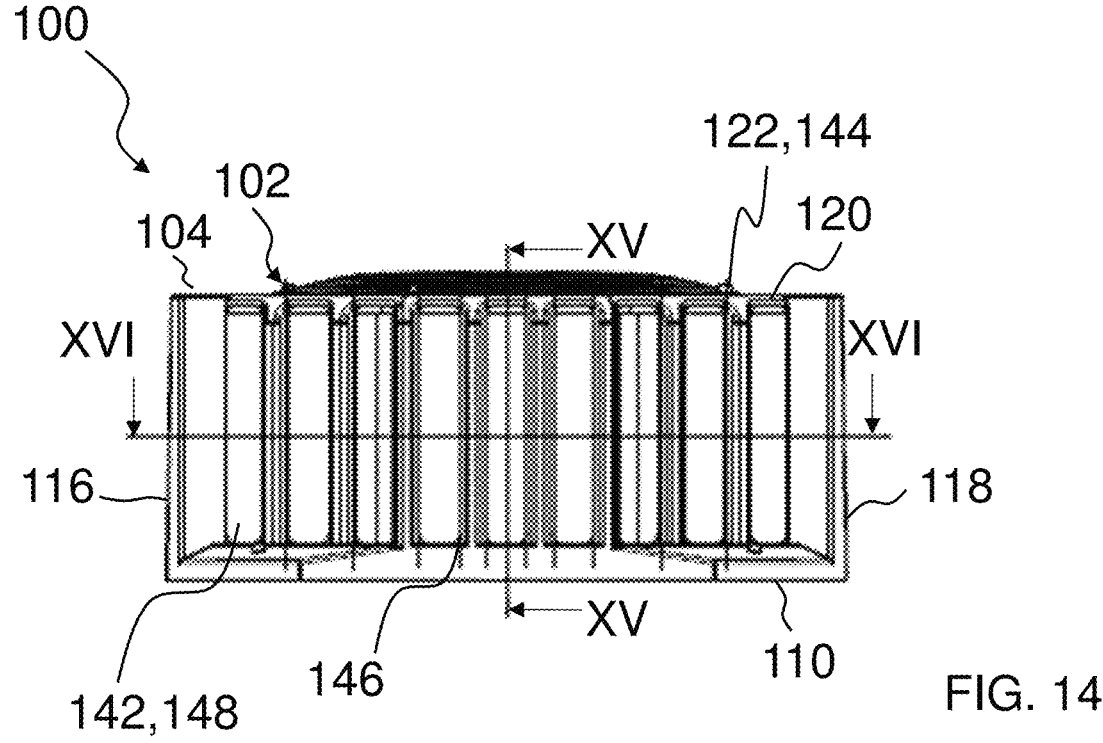
FIG. 14 is a front view of the air purifier shown in FIG. 13 indicating intersection lines XV-XV and XVI-XVI.
Figure 15:
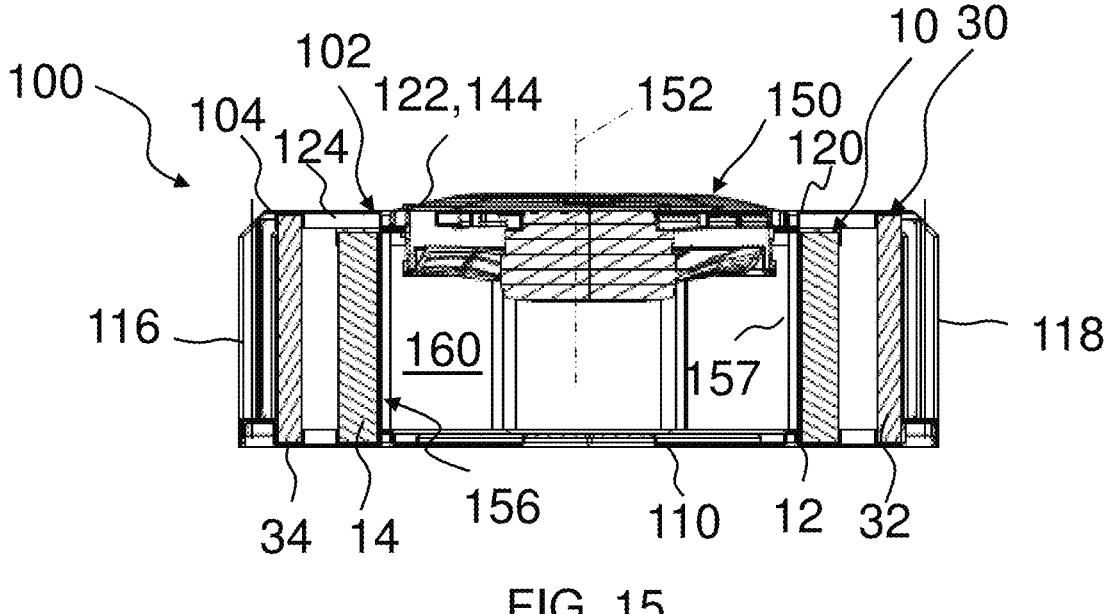
FIG. 15 is a cut view through the outdoor air purifier of FIG. 14 along intersection line XV-XV of FIG. 13.
Figure 16:
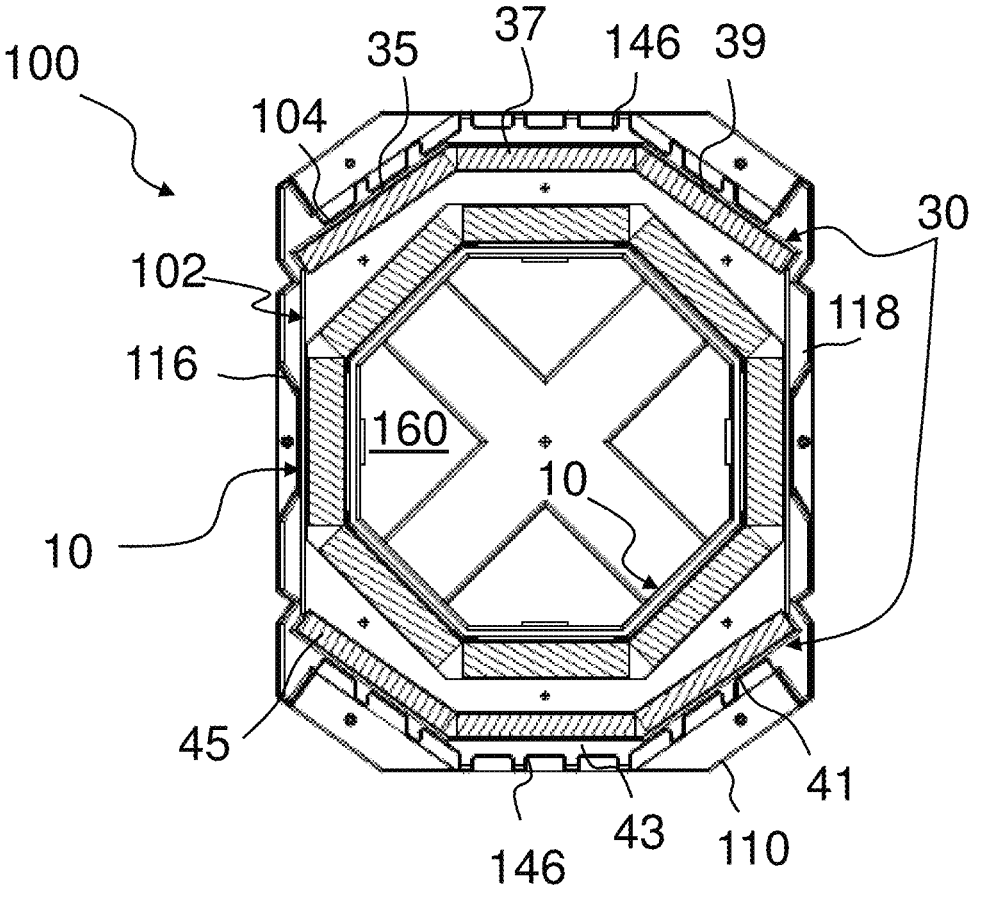
FIG. 16 is a cut view through the outdoor air purifier of FIG. 14 along intersection line XVI-XVI of FIG. 13.
Figure 17:
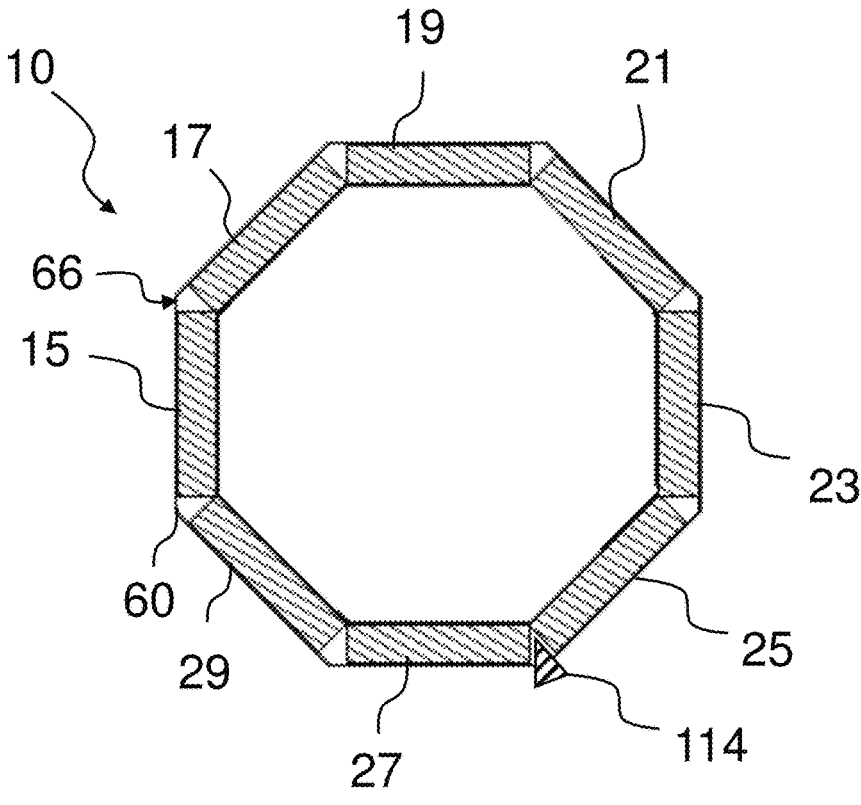
FIG. 17 is a top view of a detail of the filter element of FIG. 13 featuring filter segments connected by a side band.
Figure 18:
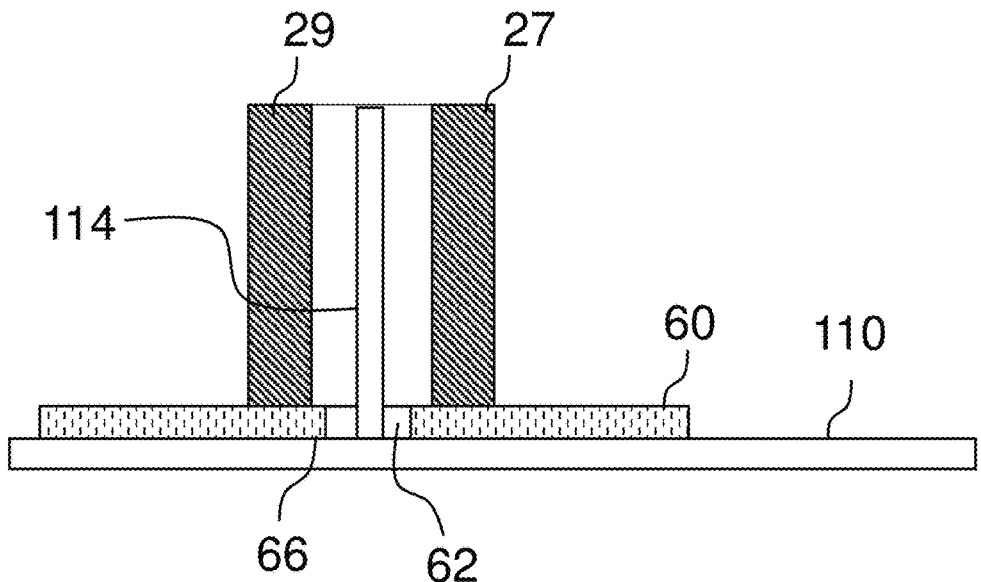
FIG. 18 is a side view of a detail of two filter segments connected by a side band of FIG. 17.
Figure 19:
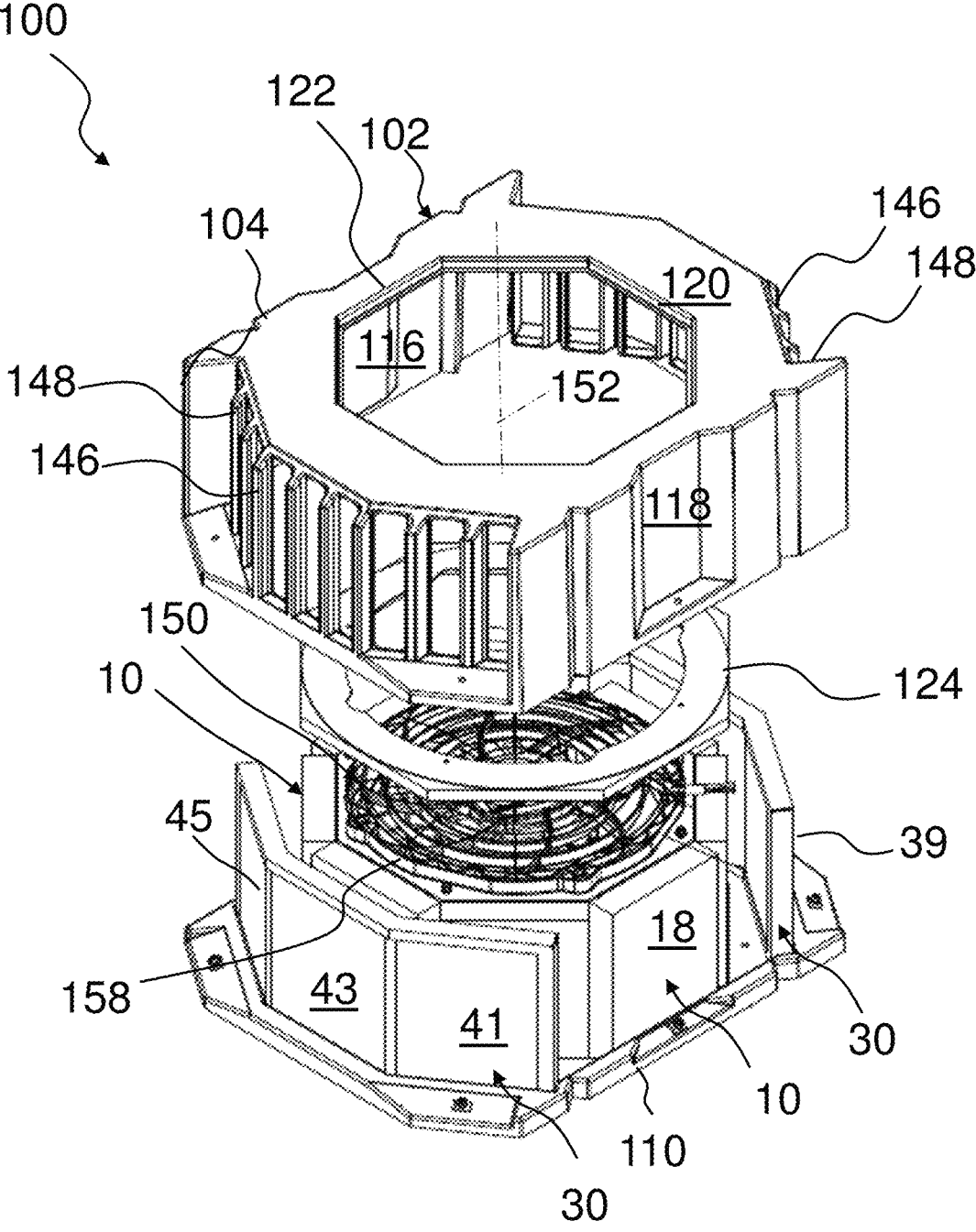
FIG. 19 is a partially exploded view of the outdoor air purifier of FIG. 13.

FIGS. 13 to 19 show another embodiment of an outdoor air purifier 100 according to the invention. FIG. 13 shows a perspective view of an outdoor air purifier 100, and FIG. 14 shows a front view of the air purifier 100 indicating intersection lines XV-XV and XVI-XVI. FIG. 15 shows a cut view through the outdoor air purifier 100 along intersection line XV-XV of FIG. 13, and FIG. 16 shows a cut view through the outdoor air purifier 100 along intersection line XVI-XVI of FIG. 13. FIG. 17 shows a top view of a detail of a filter element 10 of FIG. 13 featuring filter element segments 15, 17, 19, 21, 23, 25, 27, 29 connected by a side band 60, and FIG. 18 shows a side view of a detail of two filter segments 27, 29 connected by the side band 60 featuring a through hole 62 and a housing structure 114. FIG. 19 shows in a partially exploded view the outdoor air purifier 100.

The outdoor air purifier 100 includes a housing 102 mounted to a mounting base 110. The mounting base 110 includes at least one mounting element that is adapted for the mounting of the outdoor air purifier 100 to a vehicle in particular a roof or roof rail or the like.

The housing 102 includes at least one housing cover part 104 and has a flow inlet 142 for outdoor air to be purified on each of two opposing sides of the housing 102 and a flow outlet 144 for cleaned air in a housing cover part 104. The flow inlet 142 is arranged between two side walls 116, 118 of a housing cover part 104. The housing cover part 104 includes the side walls 116, 118 which connect the housing cover part 104 to the mounting base 110. The housing cover part 104 includes or consists of a plastic material, especially an injection-moldable plastic material.

The housing cover part 104 includes a top cover wall 120 extending axially displaced from the mounting base 110 and is arranged, in this embodiment, perpendicular to a rotational axis 152 of a fan 150. The top cover wall 120 includes an opening 122 that acts as the flow outlet 144. In this embodiment a diameter of the opening 122 corresponds to a diameter of the fan 150.

The housing 102 has a curved grille 146 extending over each flow inlet 142 and being integrally formed with the housing cover part 104. The flow inlet 142 is provided in the openings 148 of the housing 102 each covered by the grille 146.

As can be seen in FIGS. 13, 16, 17 and 19, the cross sections of the filter elements 10, 30, mounting base 110 and the housing 102 are essentially polygonal, e.g. octagonal.

The filter element 10 as main filter element surrounds the inner clean air space 160 of the housing 102 circumferentially and extends essentially parallel to the rotational axis 152 of the fan 150. A prefilter element 30 is arranged radially outside, i.e. upstream, of the filter element 10. The filter elements 10, 30 may be connected by a side band (not shown). The prefilter element 30 may be a separate component or may be attached to the main filter element 10.

As can be seen in FIG. 17 the filter element 10 has an octagonal cross section and is composed of a multitude of filter element segments 15, 17, 19, 21, 23, 25, 27, 29. At least two of the of filter element segments 15, 17, 19, 21, 23, 25, 27, 29 are connected by means of a side band 60 which is attached at on side of the filter element 10. This may be attached to the top or the bottom of the filter element 10 or both. The side band 60 extends essentially parallel to the mounting base 110. The multitude of filter element segments 15, 17, 19, 21, 23, 25, 27, 29 are connected to each other at the radially inner edges and have an open space between them at the outside. In other embodiments it is possible that only two individually neighboring filter element segments 15, 17, 19, 21, 23, 25, 27, 29 are connected by side bands 60.

As can be seen in FIGS. 15 and 19 a ring 124 is arranged between the housing cover part 104 and the filter element 10 which contacts the upper part of the filter element 10 when the housing cover part is closed.

Likewise, the prefilter element 30 is composed of a multitude of filter segments 35, 37, 38, 39, and 41, 43, 45. The prefilter element 30 is split in two halves with an equal number of segments 35, 37, 38, 39, and 41, 43, 45 in each half.

The main filter element 10 in total covers an angular portion of at least 270°, preferably at least 330°, of the circumference of the inner clean air space 160 and is arranged essentially coaxial to the rotational axis 152 of the fan 150.

FIG. 18 illustrates schematically two abutting filter segments 27, 29 attached to the side band 60. In a connecting region 66 between two neighboring filter segments 27, 29 at least one through-hole 62 is provided, in particular a cut or a slot, through which a housing structure 114 protrudes. The housing structure 114 may be attached to the mounting base 110 or attached to the housing cover part 104 (not shown).

The housing structure 114 is provided for positioning the multitude of filter element segments 15, 17, 19, 21; 23, 25, 27, 29.

Likewise, the filter segments 35, 37, 39, and 41, 43, 45 of the prefilter element 30 may be connected by a side band 60 (not shown) and positioned via housing structures 114 (not shown).

The housing structure 114 may be configured as struts or blades, which are configured to protrude through the side band 60.

The housing structures 114 protruding in the through holes 62 of the side band 60 assure the correct mounting of the octagonally arranged main filter element 10 and assure the correct flow direction in a poka-yoke manner.

Slicing the filter elements 10, 30 allows the filter elements 10, 30 to be packaged and transported as flat prisms, thus minimizing package volume and allowing stacking of the filter elements 10, 30.

The fan 150 with its standing rotational axis 152 is arranged within the housing 102, wherein the at least one flow inlet 142 is arranged radially with regards to the rotational axis 152 of the fan 150. The at least one outlet 144 is arranged axially with regards to the rotational axis 152 of the fan 150.

The fan 150 is displaced axially from the mounting base 110 of the housing 102 and is in fluid connection with the inner clean air space 160. The fan 150 is held by a support structure 156 attached to the mounting base 110. The support structure 156 includes at least the one strut 157 which extends perpendicular with regards to a plane of the mounting base 110.

The support structure 156 is embodied as a support cage having a multitude of struts 157 angularly distributed around the circumference. The support structure 156 is arranged within an inner clean air space 160 and delimits the inner clean air space 160 radially. The fan 150 is attached to an upper ring element 158 of the support structure 156 which is supported by the struts 157. For instance, a grid-like cover 151 of the fan 150 may rest on the upper ring element 158 (FIG. 19). The struts 157 are resting on a lower ring segment 159 of the support structure 156 which is attached to the mounting base 110. In particular, the support structure 156 may be composed of cylinder segments with two strut segments at each side connected at one end with regards to the rotational axis 152 of the fan 150 by an upper circular segment and at the opposing end with regards to the fan rotational axis 152 by a lower circular segment. In an assembled state of the cylinder segments, two abutting strut segment constitute one of the struts 157.

The support structure 156 acts as a radial support for the at least one filter element 10, 30. The filter elements 10, 30 are curved with a curving radius corresponding to a radius of the support structure 156.

A typical value of the electric power per flow rate for the air purifier 100 is not more than 100 W per 1000 m³/h. The height of the housing 102 is less 400 mm, preferred less than 350 mm, most preferred less than 300 mm. A ratio of height vs. fan diameter is less than 1, preferred less than 0.8, most preferred less than 0.7. The filter efficiency is between 50-95% ePM2.5 (ISO 16890), preferably between 60-90%.

As can be seen in particular in FIG. 19, the filter elements 10, 30 can be removed from the housing 102 by removing the housing cover part 104 and remove the filter elements 10, 30 in vertical direction.

In an alternative embodiment not shown, the housing cover part 104 may be attached to the mounting base 110 via a hinge so that the housing 102 can be opened by tilting the housing cover part 104.

The invention claimed is:

1. An outdoor air purifier comprising:
    a housing comprising at least one housing cover part, a mounting base, at least one flow inlet for outdoor air to be purified, at least one flow outlet for cleaned air, and an inner clean air space;
    a fan having a standing rotational axis and arranged within the housing, wherein the at least one flow inlet is arranged radially with regards to the standing rotational axis, and the at least one flow outlet is arranged axially with regards to the standing rotational axis;
    at least one filter element at least partially surrounding the inner clean air space,
    wherein the fan is displaced axially from the mounting base and is in fluid connection with the inner clean air space,
    wherein the at least one filter element extends essentially parallel to the standing rotational axis,
    wherein the at least one filter element comprises a multitude of filter element segments neighboring each other circumferentially,
    wherein the multitude of filter segments is arranged in a polygonal or circular shape around the standing rotational axis,
    wherein at least two of the multitude of filter element segments are connected through at least one side band extending essentially parallel to the mounting base, the at least one side band comprising at least one through-hole in a connecting region between two neighboring ones of the multitude of filter element segments; and
    a housing structure for positioning the multitude of filter element segments to protrude through the through-hole.

2. The outdoor air purifier according to claim 1, wherein the at least one filter element in total covers an angular portion of at least 270° of a circumference of the inner clean air space.

3. The outdoor air purifier according to claim 1, wherein the at least one filter element is arranged essentially coaxial to the standing rotational axis of the fan.

4. The outdoor air purifier according to claim 1, wherein the at least one through-hole of the side band is a cut or a slot.

5. The outdoor air purifier according to claim 4, wherein the housing structure is a strut or a blade.

6. The outdoor air purifier according to claim 1, wherein the at least one filter element is arranged concentrically around a center of the inner clean air space, the center of the inner clean air space being defined by the standing rotational axis of the fan.

7. The outdoor air purifier according to claim 1, wherein the at least one filter element comprises a pleated filter bellows.

8. The outdoor air purifier according to claim 1, further comprising a support structure attached to the mounting base and for holding the fan.

9. The outdoor air purifier according to claim 8, wherein the support structure comprises a support cage comprising a multitude of struts angularly distributed around a circumference.

10. The outdoor air purifier according to claim 8, wherein the support structure has a radially outer side acting as a radial support for the at least one filter element.

11. The outdoor air purifier according to claim 8, wherein the at least one filter element is curved with a curving radius corresponding to a radius of the support structure.

12. The outdoor air purifier according to claim 1, wherein the at least one housing cover part comprises a top cover wall extending axially displaced from the mounting base, and at least one side wall connecting the at least one housing cover part to the mounting base.

13. The outdoor air purifier according to claim 12, wherein the top cover wall comprises at least one opening acting as the at least one flow outlet.

14. The outdoor air purifier according to claim 13, wherein the top cover wall in a region of the at least one opening comprises a circumferential wall surrounding the at least one opening having, in an axial direction, an increasing diameter.

15. The outdoor air purifier according to claim 1, further comprising at least one contact free electrical energy transfer means arranged at the housing.

\* \* \* \* \*